United States Patent [19]

Mauron et al.

[11] 3,993,795
[45] Nov. 23, 1976

[54] PROCESS FOR FORTIFYING FOODSTUFFS WITH PRO-LYSINES

[75] Inventors: Jean Mauron; Paul-Andre Finot, both of Vevey; Francoise Mottu, La Tour-de-Peilz, all of Switzerland

[73] Assignee: Societe d'Assistance Technique pour Produits Nestle S.A., Lausanne, Switzerland

[22] Filed: Feb. 6, 1975

[21] Appl. No.: 547,440

[30] Foreign Application Priority Data
Mar. 5, 1974 Switzerland............................ 3123/74

[52] U.S. Cl. .................................. 426/618; 426/23; 426/623; 426/648; 426/656
[51] Int. Cl.² ............................................ A23L 1/10
[58] Field of Search ........... 426/648, 656, 618, 619, 426/620, 621, 625, 623, 23, 19, 62, 549, 622

[56] References Cited
UNITED STATES PATENTS

| | | | |
|---|---|---|---|
| 2,879,164 | 3/1959 | White et al. | 426/549 |
| 2,945,049 | 7/1960 | Chang et al. | 426/656 |
| 3,015,567 | 1/1962 | Hause et al. | 426/656 |
| 3,365,300 | 1/1968 | Thomas | 426/549 |

*Primary Examiner*—Raymond N. Jones
*Attorney, Agent, or Firm*—Kenyon & Kenyon Reilly Carr & Chapin

[57] ABSTRACT

The present invention is concerned with a process for treating foodstuffs low in lysine, such as cereals, which comprises adding to the foodstuff an effective amount of at least one metabolic substitute for L-lysine. This substitute may be chosen in the group comprising the $\epsilon$-aminoacyl-L-lysines, the $\alpha$, $\epsilon$-diaminoacyl-L-lysines and the Schiff's bases of L-lysine.

8 Claims, No Drawings

PROCESS FOR FORTIFYING FOODSTUFFS WITH PRO-LYSINES

The present invention is concerned with a process for the treatment of foodstuffs low in lysine.

It is considered that, in general, foodstuffs of plant origin, which constitute the exclusive nourishment of a large portion of mankind, have low contents of proteins, factors necessary for the sound functioning of the organism. Moreover, it is found, unfortunately, that these proteins of plant origin are normally of poor quality, that is to say they are deficient in certain amino-acids essential to man. For example, cereals have an especially low protein content, which itself is low in the essential amino-acid lysine.

In order to restore the balance of the diet of populations who essentially eat foodstuffs of plant origin, the present trend is to add to these foodstuffs an appropriate quantity of the deficient essential amino-acid(s).

Thus, lysine is added to cereals intended for human consumption; the cereals are said to be "supplemented" or "fortified" or "enriched."

These cereals are not normally consumed raw; they are cooked or made into cakes, bread, dough and miscellaneous mixtures such as milk foods, all of which involve a cooking process. Irrespective of whether this is a gentle or severe heat treatment, for example roasting or toasting, its effect is to inactivate a portion of the added lysine. Thus, the lysine combines with the reducing sugars also present in under-going complex reactions generally designated as the "Maillard" reaction. It is then no longer capable of being assimilated by the organism. The amount that is inactivated in this way is very substantial but difficult to determine precisely having regard to the great variation in human eating and culinary habits. Consequently, as too much lysine could produce a nutritional imbalance there is no question of adding a large excess. It is found therefore that the addition of lysine to cereals in order to enhance their nutritional value, although simple in principle, is a delicate operation and seldom satisfactory.

The object of the invention is to mitigate these drawbacks. It provides a process for treating a foodstuff which comprises adding to the foodstuff an effective amount of at least one metabolic substitute of L-lysine. The expression "metabolic substitute of L-lysine" denotes a substance which plays the same role as L-lysine in human and/or animal metabolism, being converted on ingestion into free L-lysine or directly assimilable bound L-lysine. For convenience, such a metabolic substitute will be referred to as "pro-lysine." Moreover, the term lysine will be used for the natural isomer, i.e. L-lysine and, likewise, the residue lysine designates L-lysine.

In accordance with the invention, it has been found that $\epsilon$-acyl derivatives of lysine, especially $\epsilon$-aminoacyl derivatives, are particularly effective as pro-lysines. For the purposes of illustration, various derivatives of lysine were assessed in vivo growth tests in rats. In each test, one group of rats was fed a diet based on proteins deficient in lysine supplemented with a lysine derivative, and the second group was fed a similar diet enriched with lysine itself, in varying proportions. The assimilation of the lysine and of its derivatives is assessed by determining the gain in weight of the rats in a group. The relative assimilation values of these derivatives, by comparison to lysine, are the following:

| | | |
|---|---|---|
| 1. | $\alpha$-Acyl derivatives | % Assimilation |
| | Formyl | 1 – 26 |
| | Acetyl | 0 – 20 |
| | Propionyl | 0 |
| | Palmityl | 0 |
| | Oleyl | 0 |
| | Linoleyl | 0 |
| 2. | $\epsilon$-Acyl derivatives | % Assimilation |
| | Formyl | 43 – 87 |
| | Acetyl | 49 – 83 |
| | Propionyl | 0 |
| | Lauryl | 0 |
| | Palmityl | 0 |
| | Oleyl | 0 |
| | Linoleyl | 0 |
| 3. | $\epsilon$-Aminoacyl derivatives | % Assimilation |
| | Glycyl | 55 – 92 |
| | $\alpha$-L-Glutamyl | 80 – 100 |
| | $\gamma$-L-Glutamyl | 75 – 100 |
| | $\alpha$-L-Aspartyl | 80 – 100 |
| | $\beta$-L-Aspartyl | 0 – 20 |
| | L-Alanyl | 80 – 100 |
| | L-Phenylalanyl | 68 – 93 |
| | L-Leucyl | 80 – 100 |
| | $\beta$-Alanyl | 0 |
| | L-Cysteinyl | 0 |
| | $\alpha$-L-Pyroglutamyl | 0 |
| | L-Arginyl | 80 – 100 |
| 4. | $\alpha,\epsilon$-Diaminoacyl derivatives | % Assimilation |
| | Diglycyl | 80 – 100 |
| | Di-L-alanyl | 80 – 100 |
| 5. | $\epsilon,\epsilon'$-Diaminoacyl derivatives | % Assimilation |
| | Bis-L-cystinyl | 0 |
| 6. | Schiff bases | % Assimilation |
| | $\epsilon$-Benzylidene | 69 – 100 |
| 7. | Lysine fixed on | % Assimilation |
| | Polyacrolein (13.5%) | 0 – 22 |
| | Peroxidised starch (34.3%) | 11 – 43 |

The values listed in this table are ranges of which the limits correspond to the heaviest and lightest rats as compared with the lysine-fed control. The fixed lysines prepared by a process analogous to that described in Swiss Pat. No. 536,860, with the values given in parentheses representing the percentage by weight of lysine fixed on the polymer.

Thus, among the acylated derivatives only $\epsilon$-formyl-lysine and $\epsilon$-acetyl-lysine are of interest. Among the aminoacylated derivatives or peptides particularly useful are $\epsilon$-glycyl-lysine, $\epsilon$-($\alpha$-L-glutamyl)-lysine, $\epsilon$-($\gamma$-L-glutamyl)-lysine, $\epsilon$-($\alpha$-L-aspartyl)-lysine, $\epsilon$-(L-alanyl)-lysine, $\epsilon$-(L-phenylalanyl)-lysine, $\epsilon$-(L-leucyl)-lysine, $\epsilon$-(L-arginyl)-lysine, $\alpha,\epsilon$-diglycyl-lysine and $\alpha,\epsilon$-di-L-alanyl-lysine. These does not appear to be a particular relationship between assimilability and the aminoacyl radical linked to the lysine.

It should be noted that two of the listed peptides contain lysine and one other essential amino-acid, namely $\epsilon$-(L-phenylalanyl)-lysine and $\epsilon$-(L-leucyl)-lysine. As a general rule, such peptides should be utilised with care, even if they possess a high degree of assimilability, in order to avoid any risk of nutritional imbalance. For example, $\epsilon$-L-methionyl-lysine should not be added to cereals which already contain sufficient methionine within their proteins. Likewise, ε-L-tryptophyllysine should be used with care. Thus, for children, maize is deficient in lysine to the extent of 243 mg per g nitrogen (1.67 millimole per g nitrogen) but deficient in L-tryptophan only to the extent of 148 mg/g nitrogen (0.72 millimole per g nitrogen) so that addition of the dipeptide in an amount sufficient to provide the required amount of lysine would lead to an excess of tryptophan of 0.95 millimole per g nitrogen (130%), an excess which could induce a nutritional imbalance.

It might have been expected that the derivatives of lysine containing an "unusual" bond (Schiff's bases, lysine fixed on a polymer, D-L peptides) would not be assimilated by the organism which theoretically does not possess the enzyme systems necessary for breaking bonds of this type. However, it has been found that this is not necessarily the case, as is shown, for example, by ε-benzylidene-lysine.

Whilst the pro-lysines may be used for supplementing foodstuffs deficient in lysine which are not cooked, they offer particular advantages when added to foodstuffs that are cooked for consumption. Thus, because these pro-lysines are much less soluble in water than lysine, leaching by the cooking water is much more limited. Moreover, these substances are much more resistant than lysine towards undesirable chemical reactions such as, for example, reaction with active carbonyl groups formed during peroxidation of lipids, reaction with aminoacrylic acid generated during the alkaline treatments, and, above all, towards the Maillard reaction which takes place during heat treatments (baking of bread, cooking cereal-based milk food). This resistance has been demonstrated by means of model reactions with (pro-)lysine/glucose systems (lysine/glucose or pro-lysine/glucose) by determining the degree of browning following heating. The procedure used is as follows: a mixture of 0.1 M (pro-)lysine, 0.1 M glucose and 0.1 M pH 6.5 phosphate buffer (10 ml of each) is heated at 100° C for 2 hours in a sealed tube and, after cooling, the optical density of the reaction mixture is measured at 500 nm, a correction being applied for the value of the optical density of a blank containing only the 0.1 M phosphate buffer. These experiments show that, as compared with the Maillard reaction between lysine and glucose, the Maillard reactions between pro-lysine and glucose are:

one half for the α-acyl and α-L-aminoacyl lysines,
in general, one quarter for the ε-acyl and ε-L-aminoacyl lysines.
one half only for ε-glycyl-lysine.
one seventh for ε-(α-L-glutamyl)-lysine.
one quarter for α,ε-diglycyl-lysine.
comparable for ε-benzylidene-lysine.

The resistance of the pro-lysines to cooking was also compared with lysine. Groups of rats were fed a diet containing as principal source of lysine only biscuits made from flours enriched with lysine and various pro-lysine (baking at 215° C for 35 min, then at 150° C for 2 hours 15 min). After 14 days, the average weight gain of each group of rats was then determined, which is used for evaluating the available residual lysine or lysine equivalent. These tests were carried out with lysine and certain pro-lysines which performed well in the model reaction with glucose. The results obtained were as follows:

| Sample supplemented with | Availability of lysine or equivalent as a % of the amount added (to nearest 10%) |
|---|---|
| A lys, HCL | 10% |
| B ε-(α-L-glu)-lys | 70% |
| C ε-(γ-L-glu)-lys | 50% |
| D ε-gly-lys, CH₃COOH | 80% |
| E α,ε-digly-lys | 50% |
| F ε-benzylidene-lys | 50% |

It will be observed that even the most sensitive of the pro-lysines listed in the table have a resistance five times greater than lysine of which 90 percent are lost during baking of the biscuits, and, as noted elsewhere, 40 percent in baking of bread. Moreover, the results obtained with ε-glycyl-lysine and with ε-benzylidene-lysine are better than might be expected on the basis of model reactions with glucose.

It has, furthermore, been found that the addition of the (pro-) lysine markedly improves the appearance and odour of bread:

| Sample (letters represent the additives listed in the preceding table) | Appearance | Odour |
|---|---|---|
| Blank(without additive) | Normal | Neutral, slightly of yeast |
| A | Slightly bulkier | Pleasant, no taste of yeast |
| B | Browner than the blank | Pleasant, slightly better than A |
| C | Slightly brown | Like B |
| D | Slightly brown bulky | Like B and C |
| E | Normal | Slightly herbaceous, of rye |
| F | Brownest of all | Bitter almonds |

One or more pro-lysines may be added to foodstuffs in suitable amounts to provide a lysine content providing an appropriate protein balance. For example, in making bread from a wheat flour containing 130 mg lysine per gram of nitrogen (equivalent to 2.08 g lysine/100 g protein), it is desired to raise the content of lysine to a value of 270 mg/g nitrogen, the value proposed by the FAO Committee (1958). The deficiency of 140 mg lysine per g of nitrogen may be supplied by adding 252 mg ε-glycyl-lysine or 305 mg of its monoacetate. Despite small losses during baking, the bread prepared from flour supplemented in this way will have a good protein balance.

The pro-lysine may be added to the foodstuff by dry blending, or as a solution, suspension or emulsion in an appropriate vehicle such as water. The pro-lysine may also be added in the form of a salt such as, for example, a hydrochloride, an acetate, a succinate or an itaconate.

The lysine-ε-peptides described herein may be prepared by methods described by K. Hofmann; E. Stutz; G. Spuhler, H. Yajima and E. T. Schwartz, J. Am. Chem. Soc. (1960). 82. 3727; A. Neuberger and F. Sanger, Biochem. J. (1943), 37.515; D. Theodoropoulos, J. Org. Chem. (1958), 23, 140; M. L. Kornguth; A. Neide and H. Waelsch, Biochemistry (1963), 2, 740; or H. Zahn and W. Patzold, Chem. Berichte, (1963), 96, 2566.

The invention is illustrated by the following examples in which the percentages are by weight.

EXAMPLE 1

One group of 6 weaned rats is fed a diet based on wheat and gluten zein, both being proteins having a particularly low lysine content. The diet is supplemented with 0.82 millimole of lysine hydrochloride per 100 g of the diet (equivalent to 4.55 millimoles per 100 g protein). A partial lysine balance is thus restored.

In parallel, a second group of 6 weaned rats is fed an analogous diet which, however, in place of lysine hydrochloride is supplemented 0.98 millimole of $\epsilon$-($\alpha$-L-glutamyl)-lysine per 100 g of feed (equivalent to 5.44 millimoles per 100 g protein). After 14 days the average weight gain of the rats of the second group is similar to that of the first, namely 24.9 g as against 24.8 g. 0.98 millimoles of $\epsilon$-($\alpha$-L-glutamyl)-lysine are thus equivalent to 0.82 millimoles of lysine hydrochloride; the relative assimilation of this peptide is 83%, with a range of 80–100% (lightest rat — heaviest rat).

The resistance of $\epsilon$-($\alpha$-L-glutamyl)-lysine to the Maillard reaction is then evaluated by the method described above. The optical density measured at 500 nm of the reaction mixture is:

| | | |
|---|---|---|
| | $\epsilon$-($\alpha$-L-glutamyl)-lysine/glucose | = 0.20 |
| compared with | lysine/glucose | = 1.35 |
| and a blank | | = 0.0 |

Three batches of bread dough are then prepared from each of the following ingredients:

| | Batch No. 1 (control) | Batch No. 2 (lysine) | Batch No. 3 (pro-lysine) |
|---|---|---|---|
| Water | 333.6 g | 333.6 g | 333.6 g |
| Salt | 10.0 g | 10.0 g | 10.0 g |
| Flour | 538.5 g | 538.5 g | 538.5 g |
| Yeast | 17.9 g | 17.9 g | 17.9 g |
| Lys. HCL | | 1.44 g (7.9 mmoles) | |
| $\epsilon$-($\alpha$-glu)-lys | | | 2.17 g (7.9 mmoles) |

These doughs are allowed to ferment at 37° C for 75 minutes, and then allowed to stand for a further 45 minutes. Three 300 gram loaves are prepared from each batch, which are baked for 35 minutes at 215° C; the temperature of the crusts is then about 170° C. After cooling the loaves have comparable appearance, with loaf No. 3 (pro-lysine) having a more pronounced brown colour. This loaf also has the most pleasant flavour of the three, slightly better than loaf No. 2 (lysine) and, in contradistinction to loaf No. 1, free from any flavour of yeast.

Loaves No. 2 and 3 are then made into breadcrumbs which, after the addition of 25% water, are toasted in an oven at 150° C for 2¼ hours. These breadcrumbs are admixed with a basic diet containing gluten and zein and fed to two group of rats for 14 days. From the average weight gain of these groups of rats and, by reference to the first group mentioned at the beginning of this example (lysine monohydrochloride, no baking), it is found that only 11% of the lysine has survived the heat treatment compared with 72% of the $\epsilon$-($\alpha$-L-glutamyl)-lysine.

EXAMPLE 2

The procedures and experiments described in Example 1 are repeated, substituting $\epsilon$-($\gamma$-L-glutamyl)-lysine for $\epsilon$-($\alpha$-L-glutamyl)-lysine. The assimitability of the tested peptide is 85 percent, with a range of 75–100 percent; the bread does not have a yeasty flavour, and the toasted breadcrumbs contain 52 percent of the original pro-lysine.

EXAMPLE 3

$\epsilon$-glycyl-lysine is tested by the procedures described in Example 1. The assimilability is 82 percent, with a range of 55–92 percent; yeasty flavour absent; 80 percent retention in the toasted breadcrumbs.

EXAMPLE 4

$\alpha,\epsilon$-diglycyl-lysine is tested by the procedures described in Example 1. The assimilability is 82 percent, with a range of 80–100 percent; yeasty flavour absent in bread; 52 percent retention in the toasted breadcrumbs.

EXAMPLE 5

A loaf of bread is prepared as described in Example 1 using $\epsilon$-glycyl-lysine monoacetate as the pro-lysine, at a level of 2.18 g (8.25 mmoles), an amount slightly greater than the 2.07 g (7.87 mmoles) necessary for re-establishing the protein balance in the flour. This represents an excess of 5 percent, equivalent to 4 percent free pro-lysine, and is intended to compensate for the loss of pro-lysine in baking, which is about one-eighth of the loss of lysine under the same baking conditions.

After 14 days the group of rats fed a diet prepared from this bread, gluten and zein has the same average weight gain as the first group of Example 1, serving as the reference (lysine monohydrochloride, no baking), which shows that 2.07 g of pro-lysine have remained intact and the small excess added has exactly made up for the losses.

EXAMPLE 6

In the preparation of a milk food containing milk solids, wheat flour and sugar, the available lysine content of approximately 5 g per 100 g protein falls after cooking to about 2.2 g per 100 g protein (equivalent to 56 percent destruction), essentially as a consequence of the Millard reaction. 3.5 g crystalline lysine monohydrochloride (equivalent to 2.8 g lysine) per 100 g protein are thus required to restore the intial content. The same milk food may be prepared with the addition, prior to cooking, of 5.67 g of $\epsilon$-($\alpha$-L-glutamyl)-lysine per 100 g protein, corresponding to 3.02 g lysine. This small excess of 0.22 g compensates for the destruction of the pro-lysine, about 8 percent.

The milk food containing the pro-lysine is much more homogeneous than that to which lysine monohydrochloride has been added after cooking.

We claim:

1. A process for fortifying foodstuffs which comprises adding to the foodstuff at least one pro-lysine in an amount effective to enhance the nutritional value of the foodstuff, said prolysine being selected from the group consisting of $\epsilon$-aminoacyl-lysine; $\alpha,\epsilon$-diaminoacyl-lysines, Schiff bases of lysine, lysine fixed on prolyacrolein (13.5%) and lysine fixed on peroxidised starch, said pro-lysine being a metabolic substitute of L-lysine which is converted on ingestion in human or animal metabolism into free L-lysine or directly assimilable bound L-lysine.

2. A process according to claim 1, in which the foodstuff is a ceral.

3. A process according to claim 1, in which the metabolic substitute is added prior to cooking of the foodstuff.

4. A process according to claim 1, in which the metabolic substitute is ε-(α-L-glutamyl)-L-lysine, ε-(γ-L-glutamyl)-L-lysine, ε-(α-L-aspartyl)-lysine, ε-(L-leucyl)-lysine, ε-(L-phenylalanyl)-lysine, ε-(L-arginyl)-lysine, ε-(α-L-alanyl)-lysine, L-ε-glycyl-L-lysine or α,ε-diglycyl-L-lysine.

5. A process according to claim 1 in which the metabolic substitute is a Schiff's base of L-lysine.

6. A process according to claim 5 in which the metabolic substitute is ε-benzylidene-L-lysine.

7. A process according to claim 4 in which the metabolic substitute is added in the form of a salt with an edible acid.

8. A process according to claim 1 in which the metabolic substitute is added in the form of a salt with an edible acid.

* * * * *